(12) United States Patent
Pozzati et al.

(10) Patent No.: US 11,607,828 B2
(45) Date of Patent: Mar. 21, 2023

(54) PROCESS FOR JOINTING CABLES

(71) Applicant: Prysmian S.p.A., Milan (IT)

(72) Inventors: Giovanni Pozzati, Milan (IT); Florent Etienne Philippe Pelle, Milan (IT); Fulvio Loro, Milan (IT); Luigi De Martino, Milan (IT); Enrico Maria Consonni, Milan (IT); Luca Giorgio Maria De Rai, Milan (IT)

(73) Assignee: Prysmian S.p.A., Milan (IT)

( * ) Notice: Subject to any disclaimer, the term of this patent is extended or adjusted under 35 U.S.C. 154(b) by 977 days.

(21) Appl. No.: 16/348,458

(22) PCT Filed: Nov. 11, 2016

(86) PCT No.: PCT/IB2016/056795
§ 371 (c)(1),
(2) Date: May 8, 2019

(87) PCT Pub. No.: WO2018/087581
PCT Pub. Date: May 17, 2018

(65) Prior Publication Data
US 2019/0372320 A1 Dec. 5, 2019

(51) Int. Cl.
*B29C 45/14* (2006.01)
*H02G 1/14* (2006.01)
(Continued)

(52) U.S. Cl.
CPC .... *B29C 45/14426* (2013.01); *B29C 45/0046* (2013.01); *B29C 45/14639* (2013.01); *B29C 45/34* (2013.01); *H02G 1/14* (2013.01); *H02G 1/145* (2013.01); *B29C 39/10* (2013.01); *B29C 39/24* (2013.01); *B29C 39/38* (2013.01); *B29C 39/44* (2013.01); *B29C 45/464* (2013.01);
(Continued)

(58) Field of Classification Search
CPC .............. H02G 1/145; B29C 45/14549; B29C 45/14639; B29C 2045/14557; B29C 2045/00089
See application file for complete search history.

(56) References Cited

U.S. PATENT DOCUMENTS 5,560,882 A 10/1996 Daguet et al.

FOREIGN PATENT DOCUMENTS

EP 1128514 A1 8/2001
GB 2268005 A 12/1993
(Continued)

OTHER PUBLICATIONS

FIT machine translation of JP H08-308059 A, Nov. 22, 1996 (Year: 1996).*
(Continued)

*Primary Examiner* — Benjamin A Schiffman
(74) *Attorney, Agent, or Firm* — Slater Matsil, LLP

(57) ABSTRACT

In one example, an apparatus for jointing power cables includes a mold extending along a longitudinal axis, and having a feeding inlet and being made of two halves forming a longitudinal pass-through seat for receiving the cables. An extruder is connected to the feeding inlet. A heating system and a cooling system is associated with the mold. A measuring system for detecting temperature or pressure includes a plurality of probes for detecting temperature or pressure.

20 Claims, 7 Drawing Sheets

(51) Int. Cl.
- B29C 45/00 (2006.01)
- B29C 45/34 (2006.01)
- B29C 39/10 (2006.01)
- B29C 39/24 (2006.01)
- B29C 39/38 (2006.01)
- B29C 39/44 (2006.01)
- B29K 101/12 (2006.01)
- B29L 31/34 (2006.01)
- H01B 13/14 (2006.01)
- H02G 15/08 (2006.01)
- B29C 45/46 (2006.01)
- B29C 45/47 (2006.01)

(52) U.S. Cl.
CPC .... *B29C 45/47* (2013.01); *B29C 2045/14868* (2013.01); *B29K 2101/12* (2013.01); *B29K 2995/0005* (2013.01); *B29K 2995/0007* (2013.01); *B29L 2031/3462* (2013.01); *H01B 13/14* (2013.01); *H02G 15/08* (2013.01)

(56) References Cited

FOREIGN PATENT DOCUMENTS

| | | |
|---|---|---|
| JP | 0522822 A | 1/1993 |
| JP | 08182167 A | 7/1996 |
| JP | 08308059 A | 11/1996 |

OTHER PUBLICATIONS

Lemaitre, Romuald et al., "High Pressure Moulding Technology," Suboptic, May 17, 2007, 5 pages.

* cited by examiner

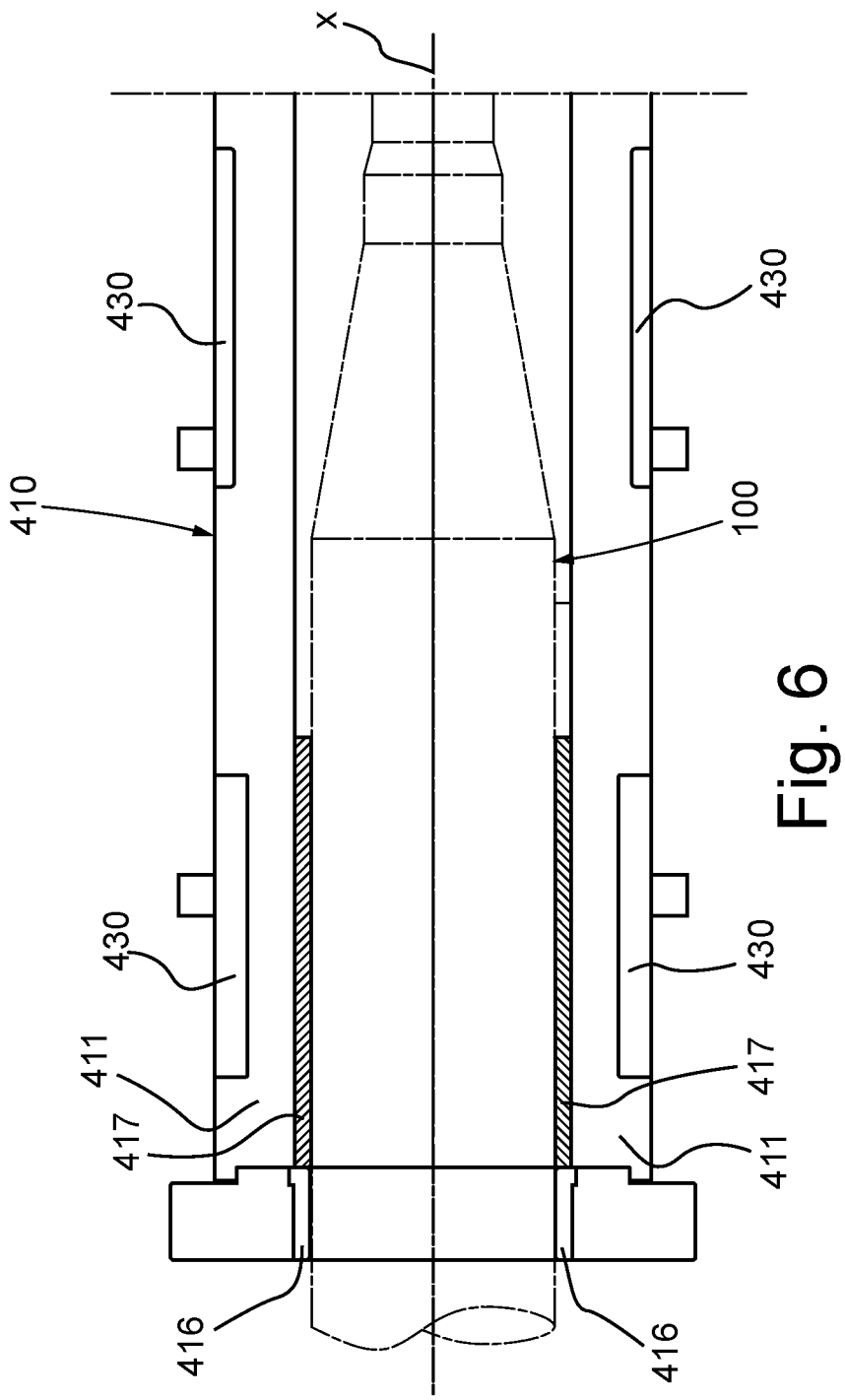

PROCESS FOR JOINTING CABLES

CROSS-REFERENCE TO RELATED APPLICATIONS

This application is a national stage of International Application No. PCT/IB2016/056795, filed on Nov. 11, 2016, which application is hereby incorporated herein by reference.

TECHNICAL FIELD

The present invention relates to a process for jointing cables, to an apparatus for performing such a process and to a thermoplastic joint so manufactured.

BACKGROUND

In this specification, the expression "high voltage" (HV) indicates voltages equal to or greater than 30 KV.

HV cables include at least one cable core. The cable core is usually formed by an electrically conductive metal conductor covered by an insulation system. Typically the insulation system is sequentially formed by an inner polymeric layer having semiconductive properties (inner semiconducting layer), an intermediate polymeric layer having electrically insulating properties (insulating layer), and an outer polymeric layer having semiconductive properties (outer semiconducting layer).

Cables for transporting electric energy at high voltage generally include a screen layer surrounding the cable core, typically made of metal or of metal and polymeric semiconductive material. The screen layer can be made in form of wires (braids), of a tape helically wound around the cable core, or of a sheet longitudinally wrapped around the cable core.

The layers of the cable insulation system are commonly made from a polyolefin-based cross-linked polymer, in particular cross-linked polyethylene (XLPE), or elastomeric ethylene/propylene (EPR) or ethylene/propylene/diene (EPDM) copolymers, also cross-linked.

Cable joints are accessories used in an energy network to connect energy cables together and to restore the insulation and electric field control over the exposed connection between the conductors of the joined cables.

For high voltage electric cables, joints can be built over the conductor connection by winding tapes of suitable materials in order to rebuild the insulating system of the cable, namely the inner semiconducting layer, the insulating layer and the outer semiconducting layer. As described by Thomas Worzyk, "*Submarine Power Cables: Design, Installation, Repair, Environmental Aspects*", Chapter 4, Springer-Verlag Berlin Heidelberg 2009, this method is particularly suitable for joining high voltage cables for submarine installations, since it allows to obtain a joint (hereinafter referred to as "diameter joint") which has a diameter equal to or just slightly larger than that of the joined cables.

A proper and reliable rebuilding of the layers of the insulation system is essential to guarantee that the joint has the same performances, both thermo-mechanical and electrical, of the remaining portions of the cable insulation system. More in detail, the rebuilding of a diameter joint requires the use of tapes made with substantially the same materials of the cable insulation system, which are sequentially applied by winding them in a very accurate and clean way, to avoid formation of voids or other defects due to impurities which can give place to electric problems, such as partial discharges. Once the winding of the tape corresponding to each layer of the cable insulation system is completed, the applied material is melted to become a continuous and homogeneous layer and, in the case of cross-linkable material, it is then cured under pressure to provide dimensional stability and to avoid deformation of the insulating system during deployment.

The jointing process above described is very cumbersome and time consuming.

In case of cables with thermoplastic insulation system, the use of tapes for building the joint has the advantage of eliminating the curing stage. On the other hand, the reconstruction of the insulation system in cable joint cannot rely upon curing for stabilization.

The patent JP 58223279 discloses a process for forming a joint made of cross-linked material, i.e. a resin, through the injection-moulding of the insulating layer wherein. In order to compensate the increase of volume of the insulating layer after the curing stage, the mould is provided with a diaphragm of deformable heat-resistant material. The resin is injected into diaphragm which is pressed down by a metal support of the mould. After the injection, a fluid medium for heating is circulated to contact the diaphragm and heat-presses the resin while triggering the cross-linking thereof. The fluid medium is also used for cooling the resin.

SUMMARY

The Applicant faced the problem of providing a process for jointing power cables that should be quicker and more reliable than the use of tapes for building a joint.

The Applicant considered the use of the injection-moulding technique, but experienced that, contrarily to what happens in the case of a curable polymer material, an injection-moulded thermoplastic insulating layer shrinks while cooling in the mould and consequently microvoids and detachments can be formed, especially at the interface between the insulating layer and the inner semiconducting layer.

The Applicant found a process that provides extrusion-moulding of the thermoplastic joint insulation layer wherein the extrusion into the mould of extruded thermoplastic material continues, during the cooling of the mould. In this way, the continuous extrusion of thermoplastic material inside the mould compensates the shrinkage of the thermoplastic material that is cooling in the mould and, therefore, the formation of microvoids is avoided.

The extrusion-moulding allows to provide the insulating layer of the joint more rapidly and easily with respect to the procedure using tapes.

According to a first aspect, the present invention relates to a process for jointing power cables comprising: providing a first power cable and a second power cable, each cable comprising an electric conductor and a thermoplastic insulation system surrounding the electric conductor; removing a length of the insulation system from each extremity of the first and second power cables, thereby exposing a corresponding length of the relevant electric conductors; electrically jointing the electric conductors of the first power cable and of the second power cable; arranging the exposed length of the electric conductors of the first and second power cables in a mould having a volume; heating the mould to a first temperature; extruding a quantity of thermoplastic insulating material into the mould at a first pressure until it fills the volume of the mould; cooling the mould from the first temperature to a second temperature; while the mould is cooling from the first temperature to a second temperature, extruding additional thermoplastic insulating material into the mould at a second pressure.

Advantageously, the second pressure is lower than the first pressure.

Preferably, the step of extruding a quantity of thermoplastic insulating material is performed by an extruder having a screw rotating at a first rotation speed and the step of extruding additional thermoplastic insulating material is performed by the same extruder having the screw rotating at a second rotation speed. The second rotation speed is advantageously slower than the first rotation speed.

Preferably, the pressures of the extruding step is exerted by the rotation speed of the extruder.

In the extruding step, the quantity of thermoplastic insulating material is substantially equal to the volume of the mould at the first temperature.

Preferably, the filling of the mould is monitored by a purge valve.

Advantageously, the process of the invention comprises the step of monitoring the first and second temperatures and the first and second pressures. In particular, the monitoring of the pressures provides information about the shrinkage of the thermoplastic insulating material.

Preferably, the step of heating of the mould is performed by a heating system, advantageously comprising a plurality of heating elements, each heating element being associated to a respective heating zones of the mould.

Advantageously, the cooling step of the mould and the step of extruding additional thermoplastic insulating material are carried out until the second temperature is reached.

In a preferred embodiment of the invention, the cooling of the mould starts at the longitudinal extremities of the mould and progressively advances towards the center of the mould. In this way, the longitudinal extremities of the joint insulation layer are consolidated before the central portion of the joint insulation layer, thus acting as lateral restraint for the central portion.

In the process of the present invention the first and second pressures, the first and second temperatures and the positioning of heating zones are selected in view of the kind and amount of thermoplastic insulating material to be extruded into the mould, for example in view of the melting temperature and of the melt flow rate of the thermoplastic insulating material. Such a selection can be made by the skilled person in view of her/his ordinary knowledge.

According to another aspect, the invention relates to an apparatus for jointing power cables comprising: a mould extending along a longitudinal axis (X), having a feeding inlet and being made of two halves forming a longitudinal pass-through seat for receiving the cables; an extruder connected to the feeding inlet; a heating system associated to the mould; a cooling system associated to the mould; a measuring system comprising a plurality of probes for detecting temperature and/or pressure.

In an embodiment, the extruder is connected to the feeding inlet via a conduit.

Advantageously, the apparatus of the invention comprises a purge valve provided, for example, in the mould or, if present, in the conduit.

Preferably, the extruder is a single-screw extruder.

In a preferred embodiment of the invention, the heating system comprises a plurality of heating elements each associated to a respective heating zone of the mould and, if present, of the conduit. The heating system can be the same of or separated from the heating system of the extruder.

Advantageously, the cooling system comprises a plurality of ducts associated to the mould wall between the two longitudinal extremities thereof. Preferably, these ducts are placed in succession one after the other between the longitudinal extremities of the mould. The ducts can be provided in the mould wall or externally to the mould wall.

Advantageously, the measuring system of the apparatus of the invention comprises probes associated to the mould and/or to the conduit, when present, and/or to the extruder, for detecting temperature and/or pressure of the extruded material. The measuring system preferably comprises an electronic processing and control unit configured for receiving the detections of the probes and controlling the heating system and the cooling system on the basis of the detections of the probes in order to check temperature and pressure and to provide a predetermined temperature profile.

Preferably, the mould comprises at least two fitting portions at each of the longitudinal extremities thereof. The fitting portion a are suitable to be coupled to the joined first and second power cables.

Advantageously, the apparatus of the invention further comprises adapters which can be coupled to the mould at each of the longitudinal extremities thereof, for example in a longitudinal side by side position with the fitting portions.

The adapters contribute to center and keep in place the first and second power cables in the receiving pass-through seat of the mould.

According to a further aspect, the invention relates to a thermoplastic joint for power cables comprising an inner semiconductive layer, an insulating layer made by extrusion-moulding and an outer semiconductive layer.

The joint of the present invention is particularly suitable for high voltage cables. As "high voltage cable" is meant a cable suitable for carrying current at more than 30 kV, especially at more than 300 kV, for example up to 800 kV.

For the purpose of the present description and of the claims that follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

Also, the terms "a" and "an" are employed to describe elements and components of the invention. This is done merely for convenience and to give a general sense of the invention. This description should be read to include one or at least one, and the singular also includes the plural unless it is obvious that it is meant otherwise.

As "insulating layer" it is meant a layer made of a material having a conductivity comprised between $10^{-16}$ and $10^{-14}$ S/m.

As "semiconductive layer" it is meant a layer made of a material having a conductivity comprised between $10^{-1}$ and 10 S/m.

BRIEF DESCRIPTION OF THE DRAWINGS

Further characteristics will be apparent from the detailed description given hereinafter with reference to the accompanying drawings, in which:

FIG. 6 is a schematic partially hatched cross-section view of another embodiment of the apparatus of FIG. 3 in an operative condition.

DETAILED DESCRIPTION OF ILLUSTRATIVE EMBODIMENTS

Figure 1:
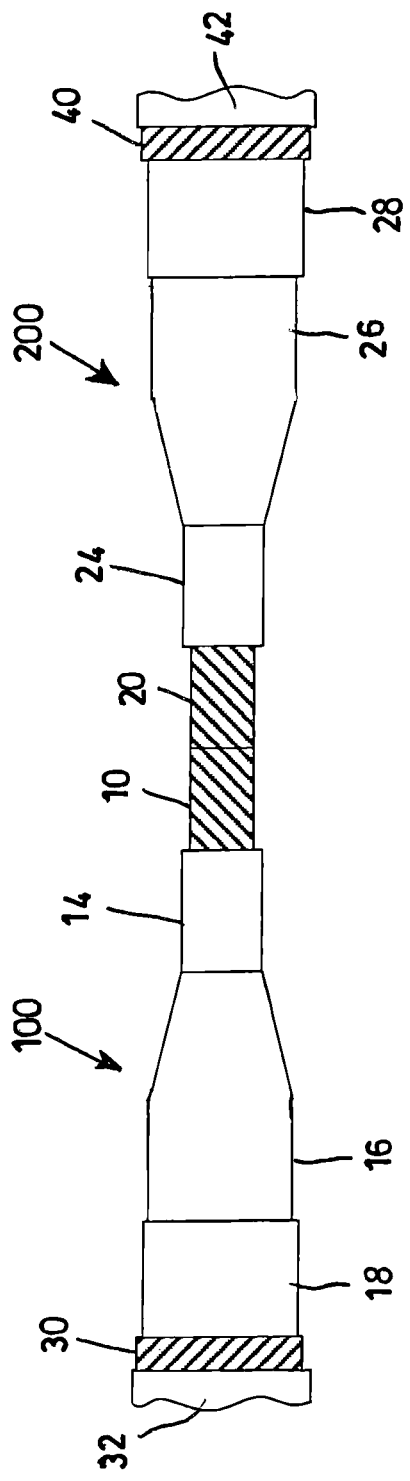
FIG. 1 is a side view of two high voltage power cables shown during an initial step of the process according to the present invention.

In FIG. 1 a first power cable 100 and a second power cable 200 are schematically represented. The first power cable 100 and the second power cable 200 are placed axially adjacent one to another, and exposed by removing portions of the upperlaying layers (listed in the following) so as to be subsequently jointed together.

Each cable 100, 200 comprises an electric conductor 10, 20 and an insulation system surrounding the respective electric conductor 10, 20. The insulation system comprises an inner thermoplastic semiconductive layer 14, 24, a thermoplastic insulating layer 16, 26 and an outer thermoplastic semiconductive layer 18, 28. The inner thermoplastic semiconductive layer 14, 24 encircles and is in direct contact with the respective electric conductor 10, 20 of the power cable 100, 200. Each thermoplastic insulating layer 16, 26 encircles and is in direct contact with the respective inner thermoplastic semiconductive layer 14, 24, and the outer thermoplastic semiconductive layer 18, 28 encircles and is in direct contact with the respective thermoplastic insulating layer 16, 26. Each insulation system of each power cable 100, 200 is sequentially surrounded by a respective metal screen 30, 40 and by one or more outer jackets 32, 42 made, for example, of polyethylene.

Figure 2:
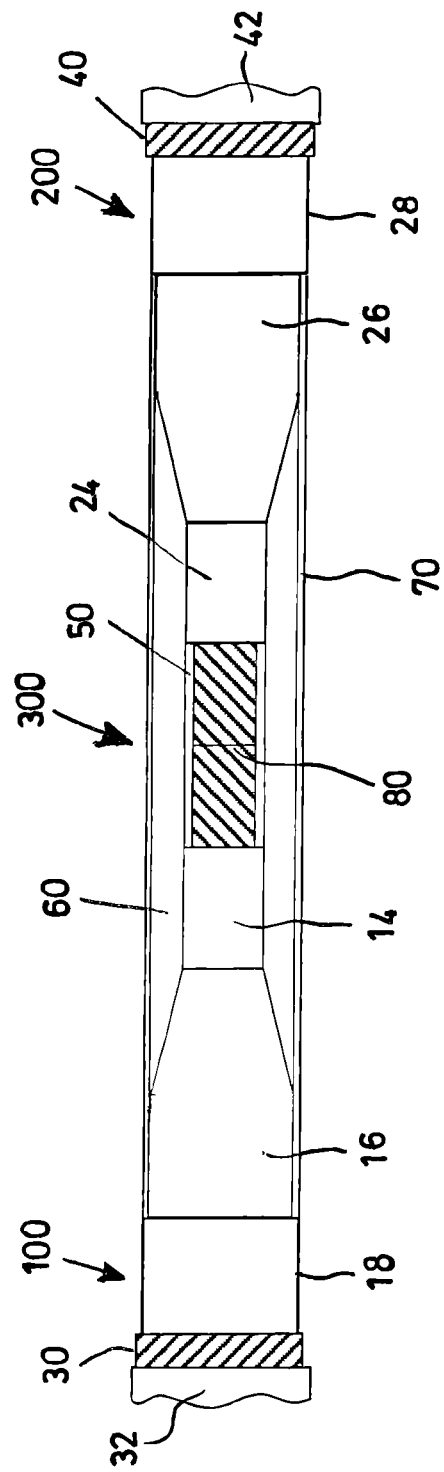
FIG. 2 is a cross-section view of a joint according to the invention electrically connecting the high voltage power cables of FIG. 1, at the completion of the process according to the present invention.

In FIG. 2 a joint 300 for joining together the first power cable 100 and the second power cable 200 is schematically represented in cross-section. The joint 300 comprises a joint inner layer 50 made of a first thermoplastic semiconductive material, a joint insulation layer 60 made of a thermoplastic insulating material, and a joint outer layer 70 made of a second thermoplastic semiconductive material. The joint inner layer 50, the joint insulation layer 60 and the joint outer layer 70 are respectively configured for rebuilding the inner thermoplastic semiconductive layer 14, 24, the thermoplastic insulating layer 16, 26 and the outer thermoplastic semiconductive layer 18, 28 of the cable insulation system.

The process for jointing power cables 100 and 200 comprises the step of joining respective terminal portions of their electric conductors 10, 20, so as to form an electric conductor joint 80. The electric conductor joint 80 can be obtained, for example, through a compression clamp (not shown) or through metal inert gas (MIG) welding.

The process for jointing power cables 100 and 200 further comprises the step of surrounding the electric conductor joint 80 with a joint inner layer 50 made of a first thermoplastic semiconductive material.

The joint inner layer 50 can be made in form of a tape to be helically wound around the electric conductor 10, 20. The joint inner layer 50 in form of tape is wound around the electric conductor joint 80 according to a conventional procedure known in the field of cable joint manufacture. Subsequently, the joint inner layer 50 is submitted to a heating step to a temperature suitable for softening the thermoplastic material thereof and for converting its shape from a tape winding to a homogeneous cylinder.

Figure 4A:
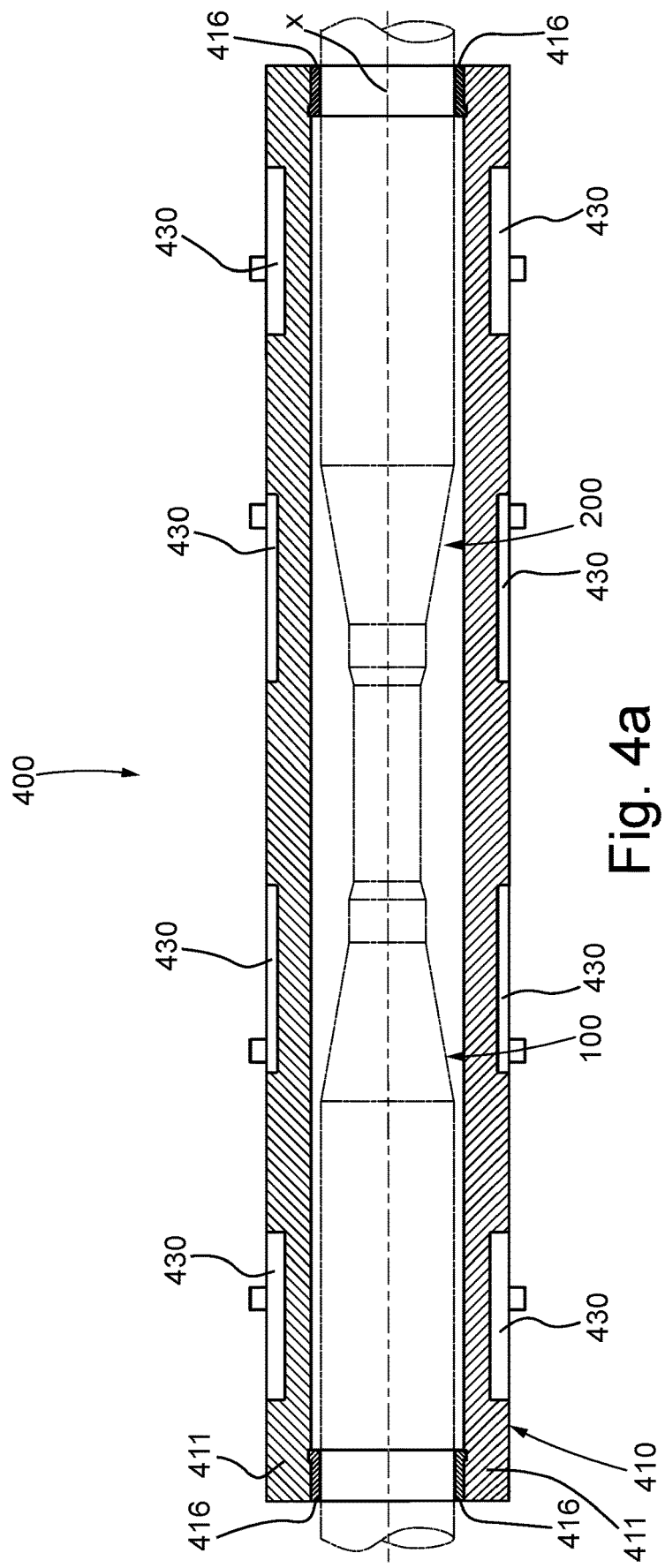
FIGS. 4a and 4b are two schematic partially hatched cross-section views of an embodiment of an apparatus of the invention in operative condition.
Figure 4B:
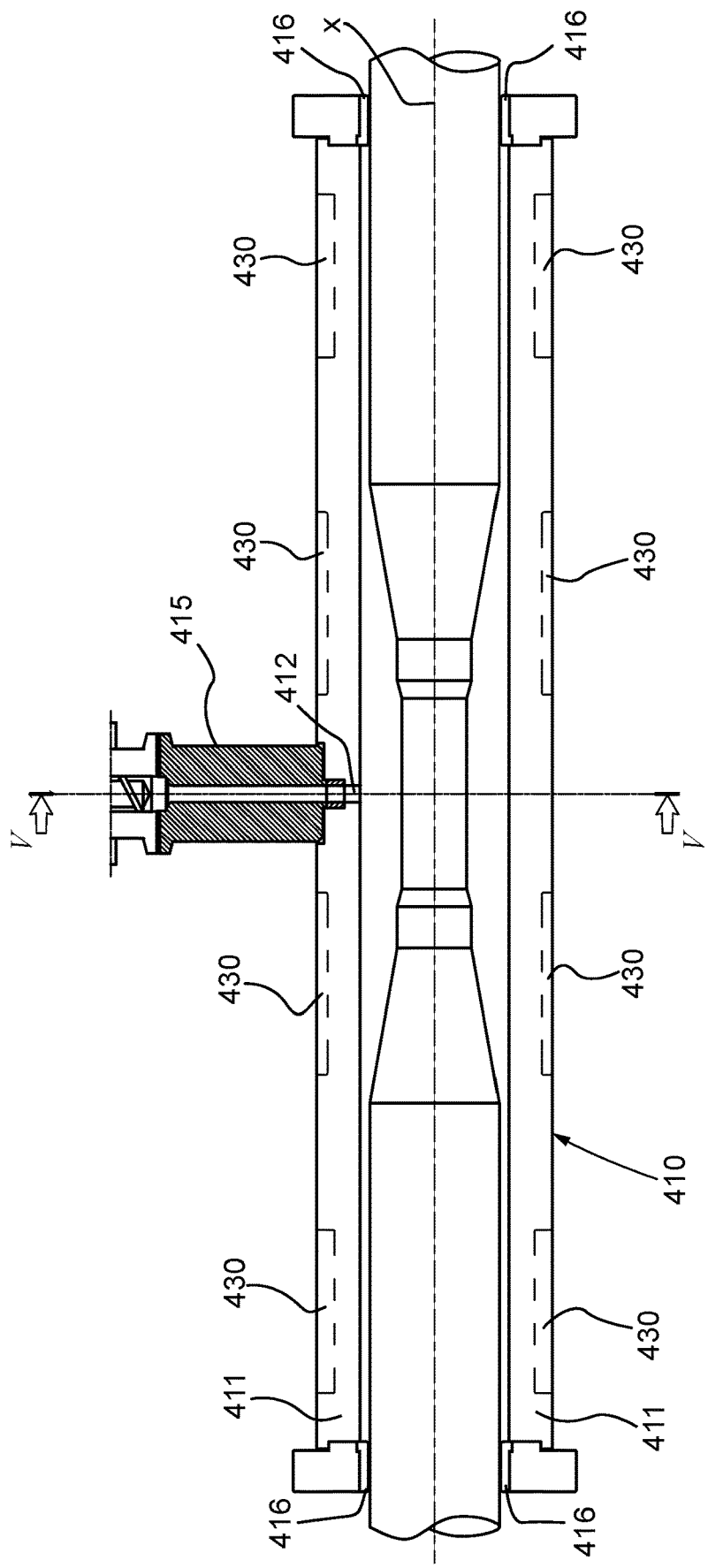
Figure 5:
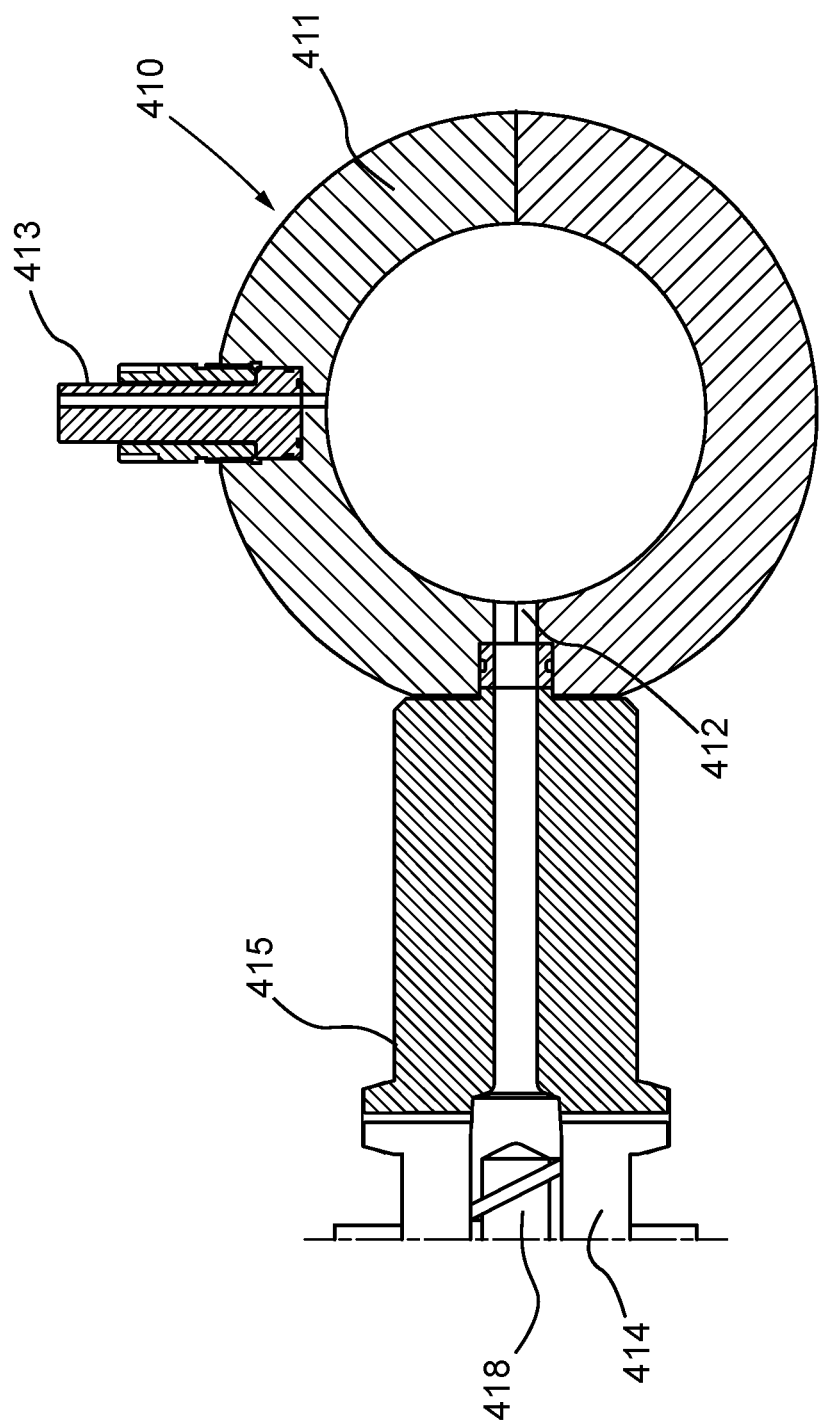
FIG. 5 is a sectional view of a portion of an apparatus of the invention.

The process for jointing power cables 100 and 200, in particular for providing the joint insulation layer 60, can be performed by an apparatus 400, depicted, for example, in FIGS. 4a, 4b and 6, comprising a mould 410 which extends along a longitudinal axis (X) and is made of two halves forming a longitudinal pass-through seat for receiving the cables 100, 200; in particular, the two halves are two-shells configured to be coupled one on the other to form the mould 410. The mould 410, moreover, presents a feeding inlet 412 (visible in FIG. 4b) and can be provided with a purge valve 413 (visible in FIG. 5).

Figure 3:
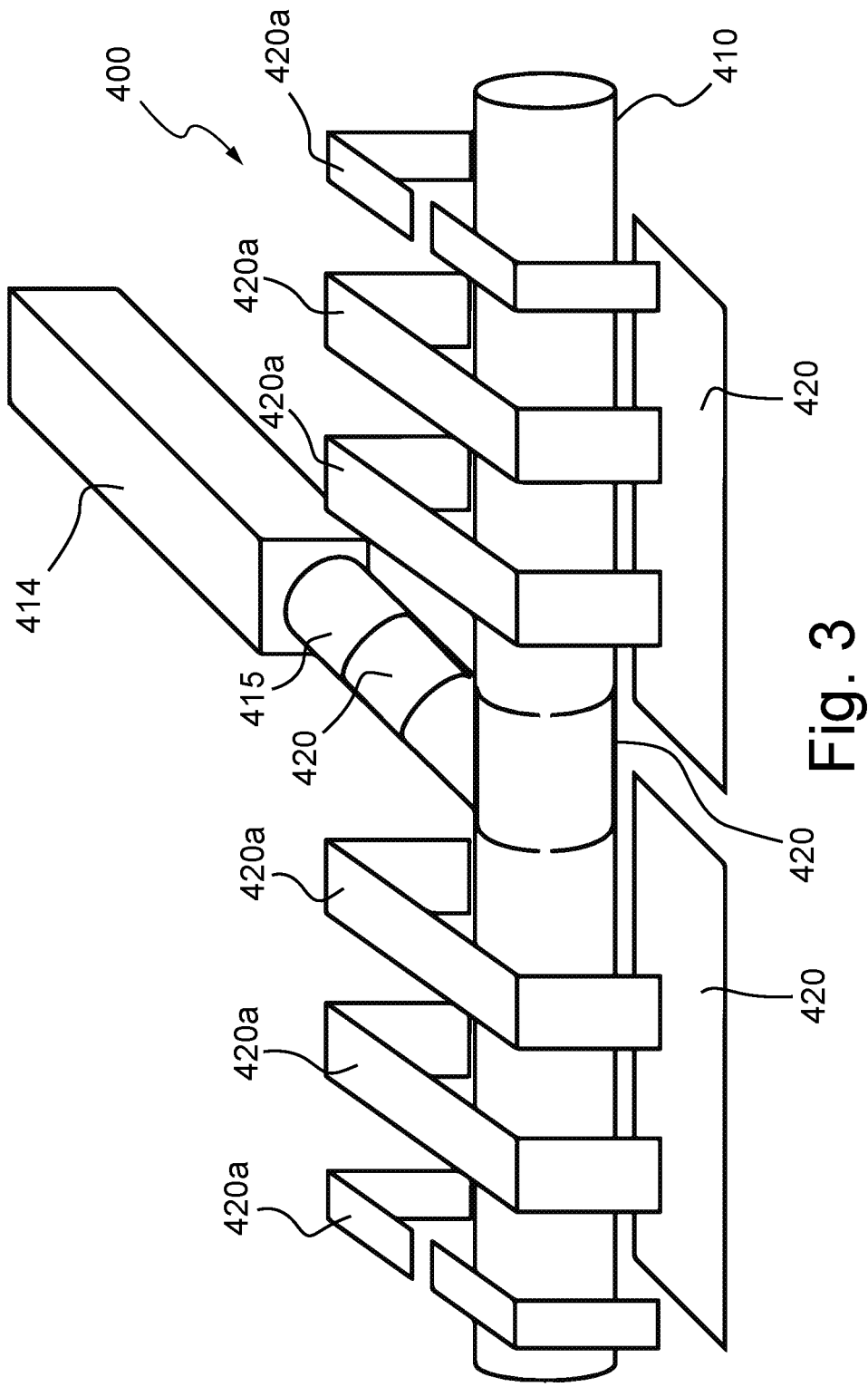
FIG. 3 is a perspective schematic view of the apparatus for performing the process according to the present invention.

As from FIG. 3, the apparatus 400 comprises an extruder 414, preferably a single-screw extruder, having a rotating screw 418. The extruder 414 is connected to the feeding inlet 412 of the mould 410, in the present case via a conduit 415. Alternatively, the extruder 414 is directly connected to the feeding inlet 412.

As from FIG. 3, the apparatus 400 comprises a heating system 420 associated to the mould 410 and, in the present case, to the conduit 415.

In the embodiment depicted, the heating system 420 comprises a plurality of heating elements 420a each associated to a respective heating zone of the mould 410 and of the conduit 415. For example, the heating elements may be made as heating resistor.

As from FIG. 4a, the apparatus 400 further comprises a cooling system associated to the mould 410. In the embodiment depicted, the cooling system 430 comprises a plurality of cooling ducts 430 provided into the mould wall and placed in succession between the two longitudinal extremities of the mould. Such cooling ducts are connected to a feeding line for circulating a cooling fluid.

The apparatus 400 further comprises a measuring system (not illustrated) for detecting temperature and pressure and comprising a plurality of probes associated to the mould 410 and to the conduit 415. The probes can be associated to the extruder 414.

The probes are configured for detecting temperature and pressure. In particular, a pressure probe is positioned in the conduit 415 and other two pressure probes are each positioned at one the longitudinal extremity of the mould 410. Each probe is preferably connected to an electronic processing and control unit (not illustrated) configured for receiving the information collected.

Advantageously, the electronic processing is also configured for controlling the heating system and the cooling system on the basis of the information coming from the measuring system in order to reach predetermined temperature profiles.

Preferably, as shown in FIG. 6, the mould 410 has a fitting portion 416 at each of the longitudinal extremities thereof. The fitting portions 416 are configured for being coupled to the cables 100, 200 and to adapt to the diameter thereof. Advantageously, the fitting portions 416 can be removable in case the diameter of cables 100, 200 exceeds the adapter capacity.

The fitting portions 416 may be each two halves of a tubular element and extend for at least a tract of the longitudinal extension of the receiving pass-through seat of the mould 410.

In a particular embodiment shown in FIG. 6, the apparatus 400 further comprises adapters 417 which can be coupled to the mould 410 at each of the longitudinal extremities thereof, for example in a longitudinal side by side position with the fitting portions 416 in order to extend the tract of superposition with the housed cables 100, 200. In addition to adapt the mould 410 dimensions to the diameter of cables 100, 200, the adapters 417 help the centering of the cables 100, 200 allowing a quick and accurate placement thereof in the receiving seat of the mould 410. Also, the adapters 417 are suitable for blocking the thermoplastic insulating material flow outside the longitudinal extremities of the mould 410.

In this way the mould 410 can be customized to house power cables with different diameters in a very simple manner.

Once the joint inner layer 50 has been provided around the electric conductor joint 80, the process for jointing power cables 100 and 200 comprises the step of arranging the connected cables 100, 200 between the two halves 411 of the mould 410 which, when joined, form the receiving pass-through seat of the mould 410.

Once the connected cables 100, 200 are arranged inside the mould 410, the process of the invention provides the step of heating the mould 410 at a first temperature and the conduit 415 at a respective temperature by the heating system 420. In particular, the heating is performed so as to obtain a predefined temperature profile. For example, the temperature at the conduit 415 and at the central portion of the mould 410 (in correspondence with the feeding inlet 412) is 20-30° C. less than the melting temperature of the thermoplastic insulating material; the temperature at the portions longitudinally adjacent the central portion of the mould 410 is 80-100° C. less than the melting temperature of the thermoplastic insulating material; and the temperature at the portions adjacent the longitudinal ends of the mould 410 is 110-130° C. less than the melting temperature of the thermoplastic insulating material.

The achievement of the suitable temperature profile is monitored by the probes of the measuring system.

The heating of the mould 410 and that of the extruder 414 (which can be performed by the same heating system or by two independent heating systems) should be adjusted to maintain the thermoplastic material at a suitable viscosity. For example, when the extruder is heated up to a temperature of about 220° C. for plasticizing and extruding the thermoplastic material, the temperature at the feeding inlet 412 (or inside the conduit 415) could be of around 180° C. and the temperature inside the mould 410, where the material should settle, could be of around 80-100° C.

The process for jointing power cables 100 and 200 further comprises the step of extruding a quantity of thermoplastic insulating material from the extruder 414 into the mould 410 through the conduit 415. One of the parameter to be considered during the extrusion step is the material extrusion pressure which should be maintained in a predetermined range depending on the material used for the joint insulation, preferably on the melt flow rate of the thermoplastic material. For example, the material extrusion pressure can be comprised from 5 to 15 bar for a material having a melt flow rate of about 0.6-1.0 g/10 min (at 230° C./2.16 kg).

The temperature profile in the apparatus 400 is set so as to guarantee a suitable extrusion rate with no damage to the cable material.

When the mould 410 has been filled, the step of cooling the mould 410 starts by activating the cooling system.

The completion of the filling of the mould 410 is indicated by thermoplastic material leaking out of the purge valve 413. In the absence of a purging valve, an increasing of the pressure into the mould is also an indication of the completion of the mould filling.

During the cooling step, the extrusion of thermoplastic insulating material is maintained though at reduced pressure which can be attained by slowing the rotation speed of the screw of the extruder from a first rotation speed to a second rotation speed. For example, if the first rotation speed is of about 15 rpm during the mould filling step and the second rotation speed is of 0.2 rpm during the cooling step.

Preferably, the mould 410 is cooled down to a second temperature which can be the room temperature. The cooling step can be carried out by feeding the cooling system with a cooling fluid such as, for example, air or water.

Advantageously, the cooling of the mould 410 is performed starting at the longitudinal extremities of the mould 410 and progressively prosecuting towards the center of the mould 410.

At the end of the cooling step, the joint insulation layer 60 has been set, the mould 410 is removed and a step of surrounding the joint insulation layer 60 with a joint outer layer 70 of a second thermoplastic semiconductive material can be carried out.

Such a joint outer layer 70 can be made in form of a tape to be helically wound around the joint insulation layer 60 according to a conventional procedure known in the field of cable joint manufacture.

Subsequently, the joint outer layer 70 is submitted to a heating step to a temperature suitable for softening the thermoplastic material thereof and for converting its shape from a tape winding to homogeneous cylinder.

The second thermoplastic material may be the same of the first/thermoplastic material or may be a different material.

Each joint layer is made of a thermoplastic material chemically compatible with and having substantially the same electrical properties of the corresponding thermoplastic material of the corresponding inner 14, 24, insulating 16, 26 and outer 18, 28 cable layer, so as to restore the cable continuity over the electric conductors 10, 20.

In comparison with the joint insulation layer, the joint inner and outer layer have a limited thickness (the exact values depend on the electrical features of the cable to be joined) and their application by a tape technique does not generally require a long time as could happen in the case of the joint insulation layer.

The invention claimed is:

1. A process of jointing power cables, the process comprising:
    providing a first power cable comprising a first electric conductor and a first thermoplastic insulation system surrounding the first electric conductor;
    providing a second power cable comprising a second electric conductor and a second thermoplastic insulation system surrounding the second electric conductor;
    removing a first length of the first thermoplastic insulation system from an extremity of the first power cable so as to expose a corresponding first length of the first electric conductor;
    removing a second length of the second thermoplastic insulation system from an extremity of the second power cable so as to expose a corresponding second length of the second electric conductor;
    electrically jointing the first electric conductor and the second electric conductor;
    arranging the exposed first and second lengths in a mold having a volume;
    heating the mold to a first temperature;
    extruding a thermoplastic insulating material into the mold at a first pressure until it fills the volume of the mold;

cooling the mold from the first temperature to a second temperature; and while the mold is cooling from the first temperature to a second temperature, extruding additional thermoplastic insulating material into the mold at a second pressure, wherein the second pressure is lower than the first pressure.

2. The process according to claim 1, further comprising monitoring the filling of the mold using a purge valve.

3. The process according to claim 1, wherein extruding the thermoplastic insulating material at the first pressure comprises rotating a screw of an extruder at a first rotation speed, wherein extruding the additional thermoplastic insulating material comprises rotating the screw of the extruder at a second rotation speed slower than the first rotation speed.

4. The process according to claim 1, further comprising monitoring the first and second temperatures and the first and second pressures.

5. The process according to claim 1, wherein the cooling of the mold and the extruding additional thermoplastic insulating material are performed until the second temperature is reached.

6. The process according to claim 1, wherein the cooling of the mold starts at the longitudinal extremities of the mold and progressively advances towards the center of the mold.

7. The process according to claim 1, wherein the mold has only one feeding inlet located in a longitudinal center of the mold and connected to an extruder, wherein the mold comprises only one purge valve located in the longitudinal center of the mold, wherein the filling of the mold is indicated by thermoplastic insulating material leaking out of the purge valve, and wherein the extruding is performed through the one feeding inlet.

8. A process of jointing power cables, the process comprising:
providing a first power cable comprising a first electric conductor and a first thermoplastic insulation system surrounding the first electric conductor;
providing a second power cable comprising a second electric conductor and a second thermoplastic insulation system surrounding the second electric conductor;
removing a first length of the first thermoplastic insulation system from an extremity of the first power cable so as to expose a corresponding first length of the first electric conductor;
removing a second length of the second thermoplastic insulation system from an extremity of the second power cable so as to expose a corresponding second length of the second electric conductor;
electrically jointing the first electric conductor and the second electric conductor;
arranging the exposed first and second lengths in a mold having a volume;
heating the mold to a first temperature;
extruding a thermoplastic insulating material into the mold at a first pressure until it fills the volume of the mold;
cooling the mold from the first temperature to a second temperature; and
while the mold is cooling from the first temperature to a second temperature, extruding additional thermoplastic insulating material into the mold at a second pressure, wherein extruding the thermoplastic insulating material at the first pressure comprises rotating a screw of an extruder at a first rotation speed, and wherein extruding the additional thermoplastic insulating material comprises rotating the screw of the extruder at a second rotation speed slower than the first rotation speed.

9. The process according to claim 8, wherein the second pressure is lower than the first pressure.

10. The process according to claim 8, further comprising monitoring the filling of the mold using a purge valve.

11. The process according to claim 8, further comprising monitoring the first and second temperatures and the first and second pressures.

12. The process according to claim 8, wherein the cooling of the mold and the extruding additional thermoplastic insulating material are performed until the second temperature is reached.

13. The process according to claim 8, wherein the cooling of the mold starts at the longitudinal extremities of the mold and progressively advances towards the center of the mold.

14. A process of jointing power cables, the process comprising:
providing a first power cable comprising a first electric conductor and a first thermoplastic insulation system surrounding the first electric conductor;
providing a second power cable comprising a second electric conductor and a second thermoplastic insulation system surrounding the second electric conductor;
removing a first length of the first thermoplastic insulation system from an extremity of the first power cable so as to expose a corresponding first length of the first electric conductor;
removing a second length of the second thermoplastic insulation system from an extremity of the second power cable so as to expose a corresponding second length of the second electric conductor;
electrically jointing the first electric conductor and the second electric conductor;
arranging the exposed first and second lengths in a mold having a volume;
heating the mold to a first temperature;
extruding a thermoplastic insulating material into the mold at a first pressure until it fills the volume of the mold;
cooling the mold from the first temperature to a second temperature; and
while the mold is cooling from the first temperature to a second temperature, extruding additional thermoplastic insulating material into the mold at a second pressure, wherein the cooling of the mold starts at the longitudinal extremities of the mold and progressively advances towards the center of the mold.

15. The process according to claim 14, wherein the mold has only one feeding inlet located in a longitudinal center of the mold and connected to an extruder, wherein the mold comprises only one purge valve located in the longitudinal center of the mold, wherein the filling of the mold is indicated by thermoplastic insulating material leaking out of the purge valve, and wherein the extruding is performed through the one feeding inlet.

16. The process according to claim 14, wherein the second pressure is lower than the first pressure.

17. The process according to claim 14, further comprising monitoring the filling of the mold using a purge valve.

18. The process according to claim 14, wherein extruding the thermoplastic insulating material at the first pressure comprises rotating a screw of an extruder at a first rotation speed, wherein extruding the additional thermoplastic insulating material comprises rotating the screw of the extruder at a second rotation speed slower than the first rotation speed.

19. The process according to claim 14, further comprising monitoring the first and second temperatures and the first and second pressures.

20. The process according to claim 14, wherein the cooling of the mold and the extruding additional thermoplastic insulating material are performed until the second temperature is reached.

\* \* \* \* \*